(12) United States Patent
Miyazaki (10) Patent No.: US 9,074,076 B2
(45) Date of Patent: Jul. 7, 2015

(54) RUBBER COMPOSITION FOR TIRE CORD COATING, BREAKER EDGE STRIP, BREAKER CUSHION OR CORD-ADJOINING STRIP, AND PNEUMATIC TIRE

(75) Inventor: Tatsuya Miyazaki, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 14/238,429

(22) PCT Filed: Aug. 31, 2012

(86) PCT No.: PCT/JP2012/072114
§ 371 (c)(1),
(2), (4) Date: Feb. 11, 2014

(87) PCT Pub. No.: WO2013/069359
PCT Pub. Date: May 16, 2013

(65) Prior Publication Data
US 2014/0228495 A1 Aug. 14, 2014

(30) Foreign Application Priority Data

Nov. 8, 2011 (JP) ................................ 2011-244712
Aug. 2, 2012 (JP) ................................ 2012-172305

(51) Int. Cl.
| | | |
|---|---|---|
| *C08K 5/41* | (2006.01) | |
| *C08L 61/04* | (2006.01) | |
| *C08L 7/00* | (2006.01) | |
| *C08G 12/32* | (2006.01) | |
| *C08G 12/42* | (2006.01) | |
| *C08L 9/00* | (2006.01) | |
| C08L 61/28 | (2006.01) | |
| C08L 91/00 | (2006.01) | |
| C08L 61/06 | (2006.01) | |
| C08L 61/32 | (2006.01) | |

(52) U.S. Cl.
CPC . *C08L 7/00* (2013.01); *C08L 61/28* (2013.01); *C08L 91/00* (2013.01); *B60C 2001/0066* (2013.04); *B60C 2001/0075* (2013.04); *Y02T 10/862* (2013.01); *C08G 12/32* (2013.01); *C08G 12/427* (2013.01); *C08L 61/06* (2013.01); *C08L 61/32* (2013.01); *C08L 9/00* (2013.01)

(58) Field of Classification Search
USPC ........................................................ 524/156
See application file for complete search history.

(56) References Cited

U.S. PATENT DOCUMENTS

| | | |
|---|---|---|
| 5,717,053 A | 2/1998 | Inui et al. |
| 6,310,144 B1 | 10/2001 | Inui et al. |
| 2004/0144468 A1 | 7/2004 | Mizuno et al. |
| 2006/0229396 A1 | 10/2006 | Mizuno et al. |
| 2008/0300368 A1 | 12/2008 | Miyazaki |
| 2010/0024947 A1 | 2/2010 | Miyazaki |

FOREIGN PATENT DOCUMENTS

| | | | |
|---|---|---|---|
| CN | 1093724 A | 10/1994 | |
| CN | 101314652 A | 12/2008 | |
| JP | 6-228374 A | 8/1994 | |
| JP | 6-234824 A | 8/1994 | |
| JP | 2004-148986 A | 5/2004 | |
| JP | 2004-217817 A | 8/2004 | |
| JP | 2005-272815 A | 10/2005 | |
| JP | 2005272815 A * | 10/2005 | .............. C08L 21/00 |
| JP | 2006-28684 A | 2/2006 | |
| JP | 2008-156418 A | 7/2008 | |
| JP | 2008156418 A * | 7/2008 | |
| JP | 2009-7549 A | 1/2009 | |
| JP | 2009-143486 A | 7/2009 | |
| JP | 2009143486 A * | 7/2009 | |
| JP | 2010-52724 A | 3/2010 | |

OTHER PUBLICATIONS

Translation of JP 2005-272815, Oct. 6, 2005.*
Translation of JP 2009-143486, Jul. 2, 2009.*
Translation of JP 2008-156418, Jul. 10, 2008.*
PCT/ISA/210—International Search Report mailed on Dec. 4, 2012, issued in PCT/JP2012/072114.
Encyclopeadia Chimica7, 2nd Pocket Edition, Kyoritsu Shuppan Co., Ltd., Jul. 1, 1966, pp. 731-733, with partial English translation.

* cited by examiner

*Primary Examiner* — Hui Chin
(74) *Attorney, Agent, or Firm* — Birch, Stewart, Kolasch & Birch, LLP (57) ABSTRACT

Provided are a rubber composition for a tire cord topping, a breaker edge strip, a breaker cushion, or a strip adjacent to cords, which achieves a balanced improvement in handling stability, fuel economy, durability, ride quality, and adhesion; and pneumatic tires including the same. The rubber composition includes: an isoprene-based rubber; a phenol resin and/or an alkylphenol resin; and a partial condensate of HMMM and/or a partial condensate of HMMPME, wherein an amount of the isoprene-based rubber is 60% by mass or higher per 100% by mass of the rubber component; and combined amount of the phenol resin and the alkylphenol resin is 2-3.9 parts by mass, combined amount of the partial condensate of HMMM and the partial condensate of HMMPME is 0.5-5 parts by mass, and an amount of silica is at most 15 parts by mass, each per 100 parts by mass of the rubber component.

21 Claims, 3 Drawing Sheets

RUBBER COMPOSITION FOR TIRE CORD COATING, BREAKER EDGE STRIP, BREAKER CUSHION OR CORD-ADJOINING STRIP, AND PNEUMATIC TIRE

TECHNICAL FIELD

The present invention relates to a rubber composition for a tire cord topping, a breaker edge strip, a breaker cushion, or a strip adjacent to cords; and pneumatic tires including such rubber compositions.

BACKGROUND ART

Rubber compositions used for tires are desired which provide a balanced improvement in handling stability, fuel economy, durability, ride quality, and adhesion to tire cords.

A proposed method for improving these properties is, for example, to add a modified resorcinol resin or the like to reinforce a rubber matrix. The problems with this method, however, are that it is difficult to increase E* and that the elongation at break is decreased. Thus, this method is unlikely to achieve a satisfactory property balance.

Another proposed method is blending natural rubber having excellent tensile properties at break with a synthetic rubber such as a modified butadiene rubber or a butadiene rubber containing 1,2-syndiotactic polybutadiene crystals. With this method, the elongation at break and the adhesion to cords may be reduced if the dispersibility of polymers is poor. Particularly in the case of a breaker topping rubber, which is required to have safety and perfect durability, there may be some problems with these properties if the synthetic rubber has been scorched or contaminated with a low molecular weight component.

Moreover, Patent Literature 1 teaches a method of using a phenol resin and the like. This method achieves good handling stability, but is not likely to give sufficient ride quality. This method also leaves something to be desired in terms of the adhesion to steel cords, and the like. Thus, there still remains room for improvement in terms of achieving a balanced improvement in handling stability, fuel economy, durability, ride quality, and adhesion.

CITATION LIST

Patent Literature

Patent Literature 1: JP 2008-156418 A

SUMMARY OF INVENTION

Technical Problem

The present invention aims to overcome the above deficiency by providing a rubber composition for a tire cord topping, a breaker edge strip, a breaker cushion, or a strip adjacent to cords, which achieves a balanced improvement in handling stability, fuel economy, durability, ride quality, and adhesion; and a pneumatic tire including such a rubber composition.

Solution to Problem

The present invention relates to a rubber composition for a tire cord topping, a breaker edge strip, a breaker cushion, or a strip adjacent to cords, the rubber composition including: an isoprene-based rubber; at least one of a phenol resin and an alkylphenol resin; and at least one of a partial condensate of hexamethoxymethylolmelamine and a partial condensate of hexamethylolmelamine pentamethyl ether, wherein an amount of the isoprene-based rubber is 60% by mass or higher based on 100% by mass of a rubber component of the rubber composition; and a combined amount of the phenol resin and the alkylphenol resin is 2 to 3.9 parts by mass, a combined amount of the partial condensate of hexamethoxymethylolmelamine and the partial condensate of hexamethylolmelamine pentamethyl ether is 0.5 to 5 parts by mass, and an amount of silica is 15 parts by mass or less, each per 100 parts by mass of the rubber component.

An amount of process oil (which is added separately from oils that are previously added to other components, such as an oil content of insoluble sulfur) is preferably 2.5 parts by mass or less per 100 parts by mass of the rubber component. The phenol resin is preferably a modified or unmodified phenol resin.

The rubber composition preferably includes, per 100 parts by mass of the rubber component, 0.5 to 3 parts by mass of a compound represented by the following formula (1):

[Chem. 1]

wherein $R^1$ represents a $C_{2-16}$ alkyl group, and $R^2$ represents a $C_{3-16}$ alkyl group, a benzothiazolyl sulfide group, or a cycloalkyl group.

The rubber composition preferably includes at least one selected from the group consisting of (A) stearic acid, (B) cobalt stearate, and (C) a mixture of a zinc salt of an aliphatic carboxylic acid and a zinc salt of an aromatic carboxylic acid. Preferably, the rubber composition has a cobalt content of 0.05 to 0.2 parts by mass per 100 parts by mass of the rubber component.

Preferably, the rubber composition includes 0.1 to 2 parts by mass of an organic thiosulfate compound per 100 parts by mass of the rubber component.

The present invention also relates to a pneumatic tire, including a rubberized tire cord component, a breaker edge strip, a breaker cushion, or a strip adjacent to cords, each formed from the above rubber composition.

Advantageous Effects of Invention

The present invention relates to a rubber composition for a tire cord topping, a breaker edge strip, a breaker cushion, or a strip adjacent to cords, the rubber composition including: a predetermined amount of an isoprene-based rubber; a predetermined amount of a phenol resin and/or an alkylphenol resin; a predetermined amount of a partial condensate of hexamethoxymethylolmelamine and/or a partial condensate of hexamethylolmelamine pentamethyl ether, and having a silica content set to a predetermined value or less. The present invention therefore provides a pneumatic tire that achieves a balanced improvement in handling stability, fuel economy, durability, ride quality, and adhesion.

DESCRIPTION OF EMBODIMENTS

The rubber composition of the present invention for a tire cord topping, a breaker edge strip, a breaker cushion, or a strip adjacent to cords includes: a predetermined amount of an isoprene-based rubber; a predetermined amount of a phenol resin and/or an alkylphenol resin; a predetermined amount of a partial condensate of hexamethoxymethylolmelamine and/or a partial condensate of hexamethylolmelamine pentamethyl ether, and has a silica content set to a predetermined value or less.

The improving methods of adding a large amount of a phenol resin or the like, for example, excessively increase E* and cause the problem of very hard ride quality although they give good handling stability. Moreover, if stearic acid components (e.g., stearic acid and cobalt stearate) and process oil, which are typically used in tires, are used together in large amounts, there are problems in that the adhesion to cords and durability (e.g., elongation at break) are deteriorated. In contrast, since the rubber composition of the present invention contains a combination of specific amounts of the specific components and has a silica content adjusted to a predetermined value or less, the rubber composition exhibits a synergistic, balanced improvement in handling stability, fuel economy, durability, ride quality, and adhesion (after dry heat aging and after hygrothermal aging) at high levels.

Examples of isoprene-based rubbers include isoprene rubber (IR), natural rubber (NR), and high-purity natural rubber (HPNR). Particularly, NR is preferred for achieving excellent properties including durability and adhesion. The NR may be one commonly used in the tire industry, such as SIR20, RSS#3, and TSR20. The IR is not particularly limited, and may be one generally used in the tire industry.

The isoprene-based rubber content based on 100% by mass of the rubber component is 60% by mass or higher, preferably 90% by mass or higher, and more preferably 100% by mass. An isoprene-based rubber content of lower than 60% by mass may not achieve sufficient elongation at break and sufficient adhesion.

In addition to the isoprene-based rubber, rubbers that can be used in the rubber component include, but are not limited to, styrene-butadiene rubber (SBR), butadiene rubber (BR), and styrene-isoprene-butadiene copolymer rubber (SIBR). Among these, modified BR and modified SBR are preferred, and modified SBR is more preferred, because they improve fuel economy and thus synergistically improve the balance of the aforementioned properties.

The modified BR is not particularly limited, and is preferably a tin-modified butadiene rubber (tin-modified BR) because it provides good fuel economy and thus synergistically improves the balance of the aforementioned properties.

The tin-modified BR is not particularly limited, and is preferably a tin-modified BR prepared by polymerization using a lithium initiator and having a tin atom content of 50 to 3000 ppm, a vinyl content of 5 to 50% by mass, and a molecular weight distribution of 2 or less.

Preferably, the tin-modified BR is prepared by polymerization of 1,3-butadiene using a lithium initiator, followed by the addition of a tin compound, and also has a tin-carbon bond at a molecular chain end thereof.

Examples of lithium initiators include lithium compounds such as alkyllithiums and aryllithiums. Examples of tin compounds include tin tetrachloride and butyl tin trichloride.

The tin-modified BR has a tin atom content of 50 ppm or higher. A tin atom content of lower than 50 ppm is likely to increase tan δ. The tin atom content is 3000 ppm or lower, and preferably 300 ppm or lower. A tin atom content of higher than 3000 ppm tends to deteriorate the processability.

The tin-modified BR has a molecular weight distribution (Mw/Mn) of 2 or less. With a Mw/Mn of more than 2, tan δ is likely to increase. The lower limit of the molecular weight distribution is not particularly limited, and is preferably at least 1.

The weight average molecular weight (Mw) and the number average molecular weight (Mn) as used herein are measured with a gel permeation chromatograph (GPC) (GPC-8000 series produced by Tosoh Corporation, detector: differential refractometer, column: TSKGEL SUPERMULTIPORE HZ-M produced by Tosoh Corporation) and calibrated with polystyrene standards.

The tin-modified BR has a vinyl content of 5% by mass or higher. A tin-modified BR with a vinyl content of lower than 5% by mass is difficult to produce. The vinyl content is 50% by mass or lower, and preferably 20% by mass or lower. With a vinyl content of higher than 50% by mass, fuel economy and tensile strength tend to decrease.

The vinyl content (the amount of 1,2-butadiene units) as used herein is measured by infrared-absorption spectrum analysis.

The tin-modified BR content based on 100% by mass of the rubber component is preferably 10% by mass or higher. A tin-modified BR content of lower than 10% by mass may not sufficiently improve the fuel economy. The tin-modified BR content is preferably 40% by mass or lower, and more preferably 30% by mass or lower. A tin-modified BR content of higher than 40% by mass tends to decrease the processability and elongation at break.

The modified SBR is not particularly limited, and may suitably be a modified SBR capable of improving the dispersibility of silica or carbon black. Particularly, those modified with a compound represented by the following formula (2) disclosed in JP 2010-111753 A are suitable because they provide excellent fuel economy and thus synergistically improve the balance of the aforementioned properties.

[Chem. 2]

(2)

In the above formula, $R^3$, $R^4$, and $R^5$ are the same as or different from each other, each representing an alkyl group, an alkoxy group (preferably $C_{1-8}$, more preferably $C_{1-4}$ alkoxy group), a silyloxy group, an acetal group, a carboxyl group (—COOH), a mercapto group (—SH), or a derivative thereof; $R^6$ and $R^7$ are the same as or different from each other, each representing a hydrogen atom or an alkyl group (preferably $C_{1-4}$ alkyl group); and n represents an integer (preferably any one of 1 to 5, more preferably 3).

$R^3$, $R^4$, and $R^5$ each are preferably an alkoxy group, and $R^6$ and $R^7$ each are preferably a hydrogen atom. With these, excellent fuel economy and hardness can be obtained.

Specific examples of the compound represented by the above formula (2) include 3-aminopropyl trimethoxysilane, 3-aminopropyl triethoxysilane, 3-aminopropyl dimethyl methoxysilane, 3-aminopropyl methyl dimethoxysilane, 2-dimethylaminoethyl trimethoxysilane, 3-diethylaminopropyl trimethoxysilane, and 3-dimethylaminopropyl trimethoxysilane.

The method of modifying a styrene-butadiene rubber with a compound (modifier) represented by the above formula (2) may be a known method such as methods described in JP H06-53768 B, JP H06-57767 B, and JP 2003-514078 T. For example, a styrene-butadiene rubber can be modified by bringing a modifier into contact with the styrene-butadiene rubber. Specific examples of the method include those including preparing a styrene-butadiene rubber by anionic polymerization and then adding a predetermined amount of a modifier to the resulting rubber solution to react the modifier with the polymerizing end (active end) of the styrene-butadiene rubber.

The modified SBR content based on 100% by mass of the rubber component is preferably 10% by mass or higher. A tin-modified BR content of lower than 10% by mass may not sufficiently improve the fuel economy. The tin-modified BR content is preferably 40% by mass or lower, and more preferably 30% by mass or lower. A tin-modified BR content of higher than 40% by mass is likely to decrease the elongation at break and adhesion.

The phenol resin may be obtained by, for example, reacting phenol and an aldehyde such as formaldehyde, acetaldehyde or furfural in the presence of an acid or alkali catalyst. Particularly, phenol resins obtained by a reaction in the presence of an acid catalyst (e.g., novolac phenol resin) are preferred.

The phenol resin preferably has a softening point of 70° C. or higher, and more preferably 85° C. or higher. The softening point is preferably 140° C. or lower, and more preferably 110° C. or lower.

The phenol resin preferably has a weight average molecular weight (Mw) of 1000 or more, more preferably 4000 or more. The Mw is preferably 10000 or less, and more preferably 7000 or less. With a Mw within the range mentioned above, the effect of the present invention can be more suitably achieved.

The phenol resin may be an unmodified phenol resin, and is suitably a modified phenol resin which has been modified using a compound such as cashew oil, tall oil, linseed oil, other animal or vegetable oils, unsaturated fatty acids, rosin, alkylbenzene resins, aniline, and melamine.

The modified phenol resin may suitably be a cashew-oil-modified phenol resin, and those represented by the following formula (3) are more suitable because they synergistically improve the balance of the aforementioned properties.

[Chem. 3]

In the above formula (3), p is an integer of 1 to 9, and preferably 5 or 6, for good reactivity and improvement in the dispersibility.

The alkylphenol resin may suitably be one formed from formaldehyde and at least one compound selected from the group consisting of a 2-alkylphenol, a 3-alkylphenol, and a 4-alkylphenol. With such an alkylphenol resin, excellent fuel economy, and durability can be obtained. Particularly, novolac alkylphenol resins are preferred because they synergistically improve the balance of the aforementioned properties, and therefore the effect of the present invention can be well achieved.

Examples of alkylphenols (monomer units) include 2-alkylphenols, 3-alkylphenols, and 4-alkylphenols. The alkylphenol is preferably at least two compounds selected from the group consisting of a 2-alkylphenol, a 3-alkylphenol, and a 4-alkylphenol, and more preferably three compounds, a 2-alkylphenol, a 3-alkylphenol, and a 4-alkylphenol, because then the effect of the present invention can be suitably achieved.

The carbon number of the alkyl group in each alkylphenol is not particularly limited, and is preferably 1 to 10, more preferably 1 to 5, still more preferably 1 to 3, and particularly preferably 1, because then the effect of the present invention can be well achieved.
Alkylphenols having alkyl groups differing in carbon number may be used in combination.

Most preferably, the 2-alkylphenol, 3-alkylphenol, and 4-alkylphenol are o-cresol, m-cresol, and p-cresol, respectively, or in other words, the alkylphenol resin is a cresol resin. In this case, the balance of the aforementioned properties is synergistically improved, and therefore the effect of the present invention can be achieved.

The alkylphenol resin is formed by, for example, reacting formaldehyde and at least one compound selected from the group consisting of a 2-alkylphenol, a 3-alkylphenol, and a 4-alkylphenol in the presence of an acid catalyst.

The acid catalyst is not particularly limited, and may be, for example, a boron trifluoride-ether complex, a boron trifluoride-phenol complex, a boron trifluoride-water complex, a boron trifluoride-alcohol complex, a boron trifluoride-amine complex, or a mixture thereof. The method of reacting alkylphenols and formaldehyde in the presence of an acid catalyst is not particularly limited, and may be a known method.

The alkylphenol resin preferably has a softening point of 90° C. or higher, more preferably 120° C. or higher, and still more preferably 125° C. or higher. Also, the softening point is preferably 140° C. or lower, and more preferably 135° C. or lower. At a softening point within the range mentioned above, the handling stability, fuel economy, durability, ride quality, and adhesion can be well achieved.

The alkylphenol resin preferably has a weight average molecular weight (Mw) of at least 1000, and more preferably at least 1500. The Mw is preferably at most 3000, more preferably at most 2500, and still more preferably at most 1900. With a Mw within the range mentioned above, the handling stability, fuel economy, durability, ride quality, and adhesion can be well achieved.

The combined amount of free 2-, 3-, and 4-alkylphenols (i.e. the total free alkylphenol content) in the alkylphenol resin is preferably 3% by mass or lower, more preferably 2% by mass or lower, and still more preferably 1% by mass or lower. With a total free alkylphenol content of higher than 3% by mass, the hardness may be reduced.

Here, the method for setting the total free alkylphenol content in the alkylphenol resin to a specific value or lower is not particularly limited. For example, after the alkylphenol resin is dissolved in a solvent, a purification treatment such as recrystallization, column chromatography, and distillation may be performed until the total free alkylphenol content in the alkylphenol resin is reduced to a specific value or less. The distillation may be suitably performed by, for example, the method described in JP 2011-74205 A.

The softening point of the phenol resin and alkylphenol resin, which is measured as set forth in JIS K 6220-1:2001 with a ring and ball softening point measuring apparatus, refers to the temperature at which the ball drops down. The weight average molecular weight (Mw) of these resins can be measured by gel permeation chromatography (GPC) and calibrated with polystyrene standards. The total free alkylphenol content is also measured by gel permeation chromatography (GPC).

The GPC of the phenol resin and alkylphenol resin as used herein is measured under the following conditions (1) to (8).
(1) Device: HLC-8020 produced by TOSOH CORP.
(2) Isolation column: GMH-XL produced by TOSOH CORP. (2 series)
(3) Measurement temperature: 40° C.
(4) Carrier: tetrahydrofuran
(5) Flow rate: 0.6 mL/min
(6) Injection rate: 5 μL
(7) Detector: differential refraction
(8) Molecular weight standards: polystyrene standards The combined amount of the phenol resin and alkylphenol resin is at least 2 parts by mass, and preferably at least 2.5 parts by mass, per 100 parts by mass of the rubber component. A combined amount of less than 2 parts by mass may not achieve sufficient hardness. The combined amount is at most 3.9 parts by mass, and preferably at most 3.7 parts by mass. A combined amount of more than 3.9 parts by mass may not lead to sufficient durability during dry heat aging and during hygrothermal aging.

The rubber composition of the present invention contains a partial condensate of hexamethoxymethylolmelamine (HMMM) and/or a partial condensate of hexamethylolmelamine pentamethyl ether (HMMPME). This strengthens a cord/rubber adhesion layer and thus synergistically improves the balance of the aforementioned properties. Particularly, in terms of achieving excellent adhesion, partial condensates of HMMPME are preferred.

The combined amount of the partial condensate of HMMM and the partial condensate of HMMPME is at least 0.5 parts by mass, and preferably at least 1 part by mass, per 100 parts by mass of the rubber component. A combined amount of less than 0.5 parts by mass may lead to a small methylene supply amount, decreasing the complex elastic modulus (E*). The combined amount is at most 5 parts by mass, and preferably at most 2 parts by mass. A combined amount of more than 5 parts by mass is likely to decrease the durability.

In the present invention, the amount of silica per 100 parts by mass of the rubber component is 15 parts by mass or less, and more preferably 10 parts by mass or less. More than 15 parts by mass of silica may decrease the complex elastic modulus (E*). With such an amount of silica, the rubber viscosity may also be increased, and the sheet processability may be deteriorated by shrinking after extrusion. The lower limit of the amount of silica is not particularly limited, and is preferably 1 part by mass or more, and more preferably 4 parts by mass or more. Less than 1 part by mass of silica may not have a sufficient effect in retarding curing and in improving the durability and adhesion.

Examples of the silica include, but not particularly limited to, dry-process silica (silicic anhydride) and wet-process silica (hydrated silica). For the reason that a large number of silanol groups are present, wet-process silica is preferred.

The nitrogen adsorption specific surface area ($N_2SA$) of silica is preferably 100 $m^2/g$ or larger, and more preferably 160 $m^2/g$ or larger. An $N_2SA$ of smaller than 100 $m^2/g$ is likely to decrease the elongation at break. The $N_2SA$ of silica is preferably 220 $m^2/g$ or smaller, and more preferably 180 $m^2/g$ or smaller. An $N_2SA$ of larger than 220 $m^2/g$ is likely to decrease the fuel economy and processability.

Here, the $N_2SA$ of the silica is determined by the BET method in accordance with ASTM D3037-93.

The rubber composition of the present invention preferably includes carbon black. This provides good reinforcement and thus synergistically improve the balance of the aforementioned properties, and therefore the effect of the present invention can be well achieved.

The nitrogen adsorption specific surface area ($N_2SA$) of the carbon black is preferably 40 $m^2/g$ or larger, and more preferably 60 $m^2/g$ or larger. An $N_2SA$ of smaller than 40 $m^2/g$ may not provide sufficient elongation at break. The $N_2SA$ is preferably 200 $m^2/g$ or smaller, and more preferably 100 $m^2/g$ or smaller. An $N_2SA$ of larger than 200 $m^2/g$ may not provide sufficient fuel economy.

The $N_2SA$ of carbon black can be measured based on JIS K6217-2:2001.

The amount of carbon black per 100 parts by mass of the rubber component is preferably at least 10 parts by mass, and more preferably 40 parts by mass. The amount of carbon black is preferably at most 70 parts by mass, and more preferably at most 65 parts by mass. The use of carbon black within the range mentioned above contributes to achieving the aforementioned properties well.

In the case of using carbon black, the carbon black content based on 100% by mass of the combined amount of silica and carbon black is preferably 50% by mass or higher, more preferably 55% by mass or higher, and still more preferably 60% by mass or higher. The upper limit of the carbon black content is not particularly limited, and is preferably 75% by mass or lower, and more preferably 70% by mass or lower although it may be 100% by mass. With a carbon black content within the range mentioned above, a rubber composition can be obtained that exhibits an excellent balance in the aforementioned properties.

In the rubber composition of the present invention, the amount of process oil per 100 parts by mass of the rubber component is preferably 2.5 parts by mass or less, more preferably 2.0 parts by mass or less, and still more preferably 1.5 parts by mass or less. With more than 2.5 parts by mass of process oil, oil is likely to coat the plated surface of steel cords, deteriorating the adhesion. Additionally, the complex elastic modulus (E*) may decrease.

The process oil refers to a petroleum oil that is added in addition to other components such as the rubber component in order to improve rubber processability (e.g. softening effect, the effect of dispersing components, lubricating effect). The process oil does not include oils that are previously added to other components such as HMMPME, insoluble sulfur, and an oil-extended rubber. Examples of process oils include paraffinic oils, naphthenic oils, and aromatic oils.

The total oil content (the combined amount of process oil and oils that are previously added to other compounding components) in the rubber composition of the present invention is preferably at most 4.0 parts by mass, more preferably at most 3.5 parts by mass, and still more preferably at most 3.0 parts by mass. With a total oil content of more than 4.0 parts by mass, oil may coat the plated surface of steel cords, deteriorating the adhesion. The lower limit of the total oil content is not particularly limited, and is preferably about 2.0 parts by mass, with the oils that are previously added to other components taken into account as well as the process oil.

The rubber composition of the present invention preferably includes a C5 petroleum resin. This provides good adhesion and handling stability, and thus synergistically improves the balance of the aforementioned properties. Examples of C5 petroleum resins include aliphatic petroleum resins made mainly from olefins and diolefins in C5 fraction obtained by naphtha cracking.

The C5 petroleum resin preferably has a softening point of 50° C. or higher, more preferably 80° C. or higher. The softening point is preferably 150° C. or lower, and more preferably 120° C. or lower. At a softening point within the range mentioned above, the aforementioned properties can be well achieved.

The amount of C5 petroleum resin per 100 parts by mass of the rubber component is preferably at least 0.5 parts by mass, and more preferably at least 1.5 parts by mass. The amount of C5 petroleum resin is preferably at most 5 parts by mass, and more preferably at most 3 parts by mass. The use of a C5 petroleum resin within the range mentioned above provides good handling stability, fuel economy, durability, ride quality, and adhesion.

The rubber composition of the present invention preferably includes a coumarone-indene resin. This provides good adhesion and durability, and thus synergistically improves the balance of the aforementioned properties.

The coumarone-indene resin preferably has a softening point of −20° C. or higher, and more preferably 0° C. or higher. The softening point is preferably 60° C. or lower, more preferably 35° C. or lower, and still more preferably 15° C. or lower. At a softening point within the range mentioned above, the aforementioned properties can be well achieved.

The amount of coumarone-indene resin per 100 parts by mass of the rubber component is preferably at least 0.5 parts by mass, and more preferably at least 1.5 parts by mass. The amount of coumarone-indene resin is preferably at most 6 parts by mass, and more preferably at most 3.5 parts by mass. The use of a coumarone-indene resin within the range mentioned above contributes to achieving the effect of the present invention well.

The rubber composition of the present invention preferably includes an organic thiosulfate compound. This provides good adhesion and thus synergistically improves the balance of the aforementioned properties. The organic thiosulfate compound is not particularly limited, and is preferably a compound represented by the following formula (4) and/or a hydrate thereof.

(4)

In the formula, q represents an integer of 3 to 10, and M's are the same as or different from each other, each representing lithium, potassium, sodium, magnesium, calcium, barium, zinc, nickel, or cobalt.

In the above formula (4), q is an integer of 3 to 10, and preferably an integer of 3 to 6. With an integer of less than 3, the elongation at break may not be sufficiently improved. With an integer of more than 10, the compound is less likely to be effective in improving the elongation at break and the like than expected from the increase in molecular weight.

In the above formula (4), M is preferably lithium, potassium, sodium, magnesium, calcium, barium, zinc, nickel, or cobalt, and more preferably potassium or sodium.

Examples of the hydrate of the compound represented by the above formula (4) include sodium monohydrate and sodium dihydrate.

The compound represented by the above formula (4) or a hydrate thereof is preferably a derivative of sodium thiosulfate, such as sodium hexamethylene-1,6-bisthiosulfate dihydrate.

The amount of organic thiosulfate compound per 100 parts by mass of the rubber component is preferably at least 0.1 parts by mass, and more preferably at least 0.3 parts by mass. Less than 0.1 parts by mass of organic thiosulfate compound may not sufficiently improve the adhesion. The amount of organic thiosulfate compound is preferably at most 2 parts by mass, and more preferably at most 1 part by mass. More than 2 parts by mass of organic thiosulfate compound is not likely to yield as much improvement as expected by the increase in the amount.

The rubber composition of the present invention preferably includes a vulcanization accelerator, particularly a compound represented by the following formula (1). This provides good handling stability, fuel economy, and durability, and thus synergistically improves the balance of the aforementioned properties.

[Chem. 4]

(1)

In the formula, $R^1$ represents a $C_{2-16}$ alkyl group, and $R^2$ represents a $C_{3-16}$ alkyl group, a benzothiazolyl sulfide group, or a cycloalkyl group.

The alkyl group for $R^1$ preferably has a branched structure because then the effect of the present invention can be well achieved. The alkyl group having a branched structure is preferably an alkyl group having a branched structure obtained by replacing, by an alkyl group, at least one hydrogen atom of the carbon chain $(CH_2)_k$ in a linear alkyl group represented by $—(CH_2)_k—CH_3$ (wherein k is an integer of 1 to 14) (i.e., a linear alkyl group having a branched structure).

The carbon number of the alkyl group for $R^1$ is preferably 3 to 16, more preferably 4 to 16, and still more preferably 6 to 12. With a carbon number of 1, the compound may be adsorbed. With a carbon number of 17 or more, the hardness tends to be reduced.

Preferred examples of the alkyl group for $R^1$ include ethyl, t-butyl, 2-ethylhexyl, 2-methylhexyl, 3-ethylhexyl, 3-methylhexyl, 2-ethylpropyl, 2-ethylbutyl, 2-ethylpentyl, 2-ethylheptyl, and 2-ethyloctyl.

The alkyl group for $R^2$ preferably has a branched structure in terms of achieving the effect of the present invention well. The alkyl group having a branched structure is preferably as mentioned for $R^1$ above.

The carbon number of the alkyl group for $R^2$ is preferably 4 to 16, and more preferably 6 to 12. With a carbon number of 2 or less, the compound tends to be adsorbed. With a carbon number of 17 or more, the hardness tends to be reduced.

Examples of the alkyl group for $R^2$ include t-butyl, 2-ethylhexyl, 2-methylhexyl, 3-ethylhexyl, 3-methylhexyl, 2-ethylpropyl, 2-ethylbutyl, 2-ethylpentyl, 2-ethylheptyl, and 2-ethyloctyl.

The benzothiazolyl sulfide group for $R^2$ is a group represented by the following formula.

[Chem. 5]

The carbon number of the cycloalkyl group for $R^2$ is preferably any of 3 to 16. Preferred examples of the cycloalkyl group for $R^2$ include cyclohexyl.

$R^2$ is preferably a benzothiazolyl sulfide group when $R^1$ is a t-butyl group, in terms of achieving handling stability, fuel economy, durability, ride quality, and adhesion well.

Examples of the compound represented by the above formula (1) include BEHZ (N,N-di(2-ethylhexyl)-2-benzothiazolylsulfenamide) from Kawaguchi Chemical Industry Co., LTD., BMHZ (N,N-di(2-methylhexyl)-2-benzothiazolylsulfenamide) from Kawaguchi Chemical Industry Co., LTD., SantoCure TBSI (N-tert-butyl-2-benzothiazolylsulfenimide) from Flexsys, and ETZ (N-ethyl-N-t-butylbenzothiazole-2-sulfenamide) from Ouchi Shinko Chemical Industrial Co., Ltd.

The amount of vulcanization accelerator per 100 parts by mass of the rubber component is preferably at least 0.5 parts by mass, and more preferably at least 1 part by mass. Less than 0.5 parts by mass of vulcanization accelerator may not sufficiently improve the handling stability. The amount of vulcanization accelerator is preferably at most 3 parts by mass, and more preferably at most 2 parts by mass. More than 3 parts by mass of vulcanization accelerator is likely to decrease the adhesion.

The rubber composition of the present invention preferably includes at least one selected from the group consisting of (A) stearic acid, (B) cobalt stearate, and (C) a mixture of a zinc salt of an aliphatic carboxylic acid and a zinc salt of an aromatic carboxylic acid. In this case, the rubber composition can be well vulcanized and thus the balance of the aforementioned properties can be synergistically improved; therefore, the effect of the present invention can be well achieved.

The combined amount of (A) stearic acid and (B) cobalt stearate, calculated as stearic acid (the total of the amount of stearic acid and the amount of cobalt stearate calculated as stearic acid) per 100 parts by mass of the rubber component is preferably at least 0.5 parts by mass, and more preferably at least 0.7 parts by mass. A combined amount of less than 0.5 parts by mass may decrease the hardness and fuel economy. The combined amount is preferably at most 2.5 parts by mass, and more preferably at most 2.0 parts by mass. A combined amount of more than 2.5 parts by mass is likely to decrease the adhesion.

The rubber composition of the present invention may include cobalt stearate as described above, and may include other cobalt salts of organic acids. In such cases, the adhesion between cords and rubber is improved. Examples of cobalt salts of organic acids include cobalt naphthenate, cobalt abietate, cobalt neodecanoate, and cobalt boron 3 neodecanoate. Particularly, boron-containing cobalt salts of organic acids are preferred because they provide excellent adhesion to cords.

Here, the cobalt content (the total cobalt content derived from cobalt stearate and other cobalt salts of organic acids) per 100 parts by mass of the rubber component is preferably at least 0.05 parts by mass, and more preferably at least 0.08 parts by mass. The cobalt content is preferably at most 0.2 parts by mass, and more preferably at most 0.12 parts by mass. The cobalt content within the range mentioned above provides good adhesion.

Examples of the aliphatic carboxylic acid in the zinc salt of an aliphatic carboxylic acid in the mixture (C) of a zinc salt of an aliphatic carboxylic acid and a zinc salt of an aromatic carboxylic acid, include aliphatic carboxylic acids derived from vegetable oils such as coconut oil, palm kernel oil, camellia oil, olive oil, almond oil, canola oil, peanut oil, rice bran oil, cacao butter, palm oil, soybean oil, cotton seed oil, sesame oil, linseed oil, castor oil, and rapeseed oil; aliphatic carboxylic acids derived from animal oils such as beef tallow; and aliphatic carboxylic acids chemically synthesized from petroleum oil. Aliphatic carboxylic acids derived from vegetable oils are preferred, and aliphatic carboxylic acids derived from coconut oil, palm kernel oil, or palm oil are more preferred, because they provide excellent handling stability.

The carbon number of an aliphatic carboxylic acid is preferably at least 4, and more preferably at least 6. The carbon number of an aliphatic carboxylic acid is preferably at most 16, and more preferably at most 12. With a carbon number within the range mentioned above, excellent handling stability can be obtained.

The aliphatic group in the aliphatic carboxylic acid may be an acyclic group such as an alkyl group or a cyclic group such as a cycloalkyl group.

Examples of the aromatic carboxylic acid in the zinc salt of an aromatic carboxylic acid, in the mixture (C) of a zinc salt of an aliphatic carboxylic acid and a zinc salt of an aromatic carboxylic acid, include benzoic acid, phthalic acid, mellitic acid, hemimellitic acid, trimellitic acid, diphenic acid, toluic acid, and naphthoic acid. Particularly, benzoic acid, phthalic acid or naphthoic acid is preferred in terms of excellent handling stability.

The ratio of the amount of the zinc salt of an aliphatic carboxylic acid to the amount of the zinc salt of an aromatic carboxylic acid (the molar ratio (the zinc salt of an aliphatic carboxylic acid)/(the zinc salt of an aromatic carboxylic acid), hereinafter referred to as the content ratio) in the mixture is preferably 1/20 or higher, and more preferably 1/10 or higher. With a content ratio lower than 1/20, the dispersibility and stability of the mixture tend to be deteriorated. The content ratio is preferably 20/1 or lower, and more preferably 10/1 or lower. With a content ratio higher than 20/1, the improvement in handling stability tends to be insufficient.

The mixture (C) of a zinc salt of an aliphatic carboxylic acid and a zinc salt of an aromatic carboxylic acid preferably has a zinc content of 3% by mass or higher, and more preferably 10% by mass or higher. The mixture preferably has a zinc content of 30% by mass or lower, and more preferably 25% by mass or lower. With a zinc content within the range mentioned above, processability and handling stability can be well achieved.

The amount of the mixture (C) of a zinc salt of an aliphatic carboxylic acid and a zinc salt of an aromatic carboxylic acid, per 100 parts by mass of the rubber component, is preferably at least 0.2 parts by mass, and more preferably at least 0.5 parts by mass. Less than 0.2 parts by mass may not sufficiently improve the handling stability. The amount of the mixture is preferably at most 2 parts by mass, and more preferably at most 1 part by mass. More than 2 parts by mass may deteriorate the fuel economy.

The combined amount of the net stearic acid content calculated from the amounts of (A) stearic acid and of (B) cobalt stearate (calculated as stearic acid) and the amount of the mixture (C) of a zinc salt of an aliphatic carboxylic acid and a zinc salt of an aromatic carboxylic acid, per 100 parts by mass of the rubber component, is preferably at least 0.5 parts by mass, and more preferably at least 0.7 parts by mass. The combined amount is preferably at most 3.5 parts by mass, and more preferably at most 3.0 parts by mass. The combined amount within the range mentioned above leads to good handling stability, durability, and adhesion.

The rubber composition of the present invention preferably includes sulfur. Examples of sulfur include powdered sulfur, precipitated sulfur, colloidal sulfur, insoluble sulfur, and highly dispersible sulfur. The amount of sulfur per 100 parts by mass of the rubber component is preferably at least 2 parts by mass, and more preferably at least 5 parts by mass. Less than 2 parts by mass of sulfur may lead to reduced handling stability and reduced adhesion. The amount of sulfur is preferably at most 8 parts by mass, and more preferably at most 6 parts by mass. More than 8 parts by mass of sulfur is likely to deteriorate EB after oxidative degradation, aging durability, and processability in terms of tackiness.

The rubber composition of the present invention may optionally contain additives generally used in production of a rubber composition, such as various antioxidants, zinc oxide, and 1,3-bis(citraconimidomethyl)benzene, as well as the components described above.

The method for preparing the rubber composition of the present invention may be a known one, such as, for example, by kneading the above-described components in a rubber kneader such as an open roll mill or a Bunbary mixer, and then vulcanizing the kneaded mixture.

The rubber composition of the present invention is used as a rubber composition for coating tire cords (rubber composition for topping), particularly as a rubber composition for breaker topping. Examples of the tire cords include fiber cords and steel cords. The rubber composition of the present invention is suitable for a steel cord topping.

Figure 1:
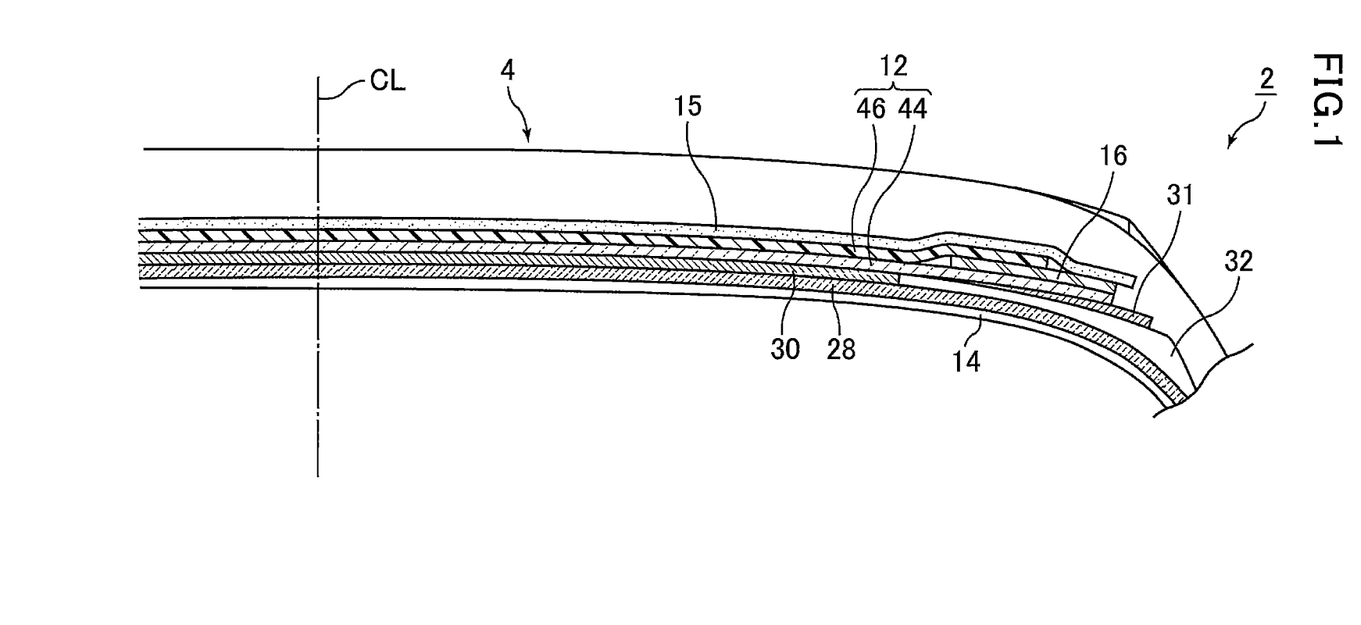
FIG. 1 is an example of a partial cross-sectional view of a pneumatic tire.
Figure 2:
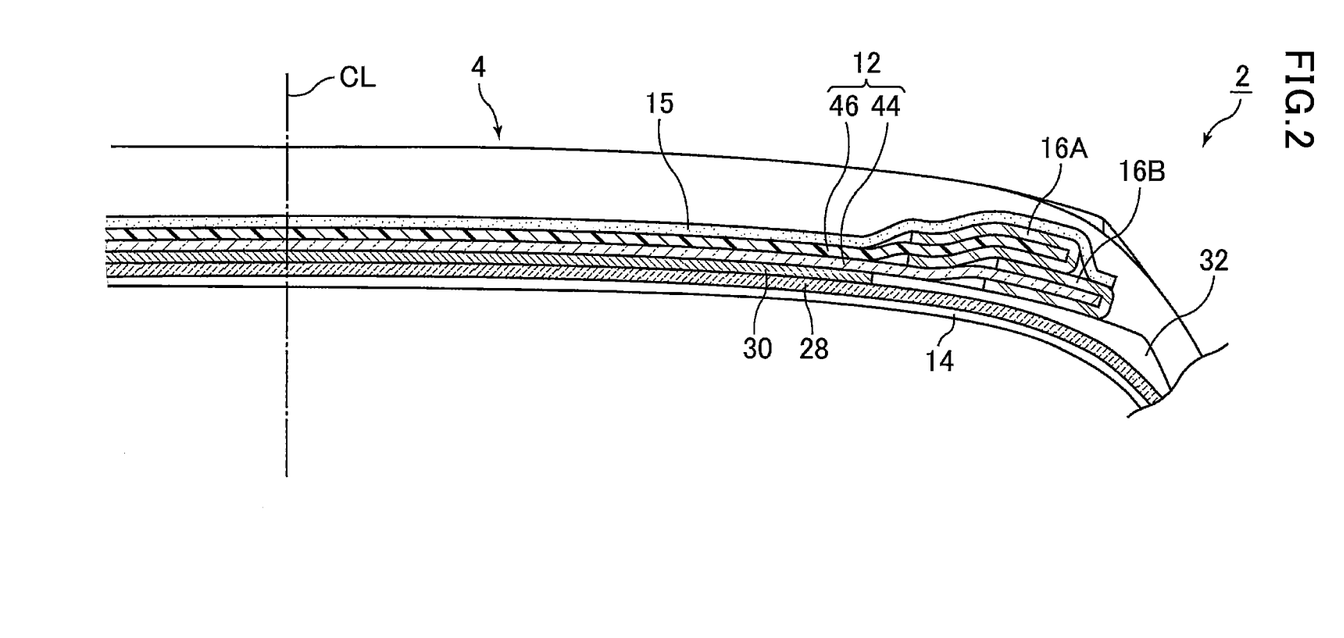
FIG. 2 is another example of a partial cross-sectional view of a pneumatic tire.
Figure 3:
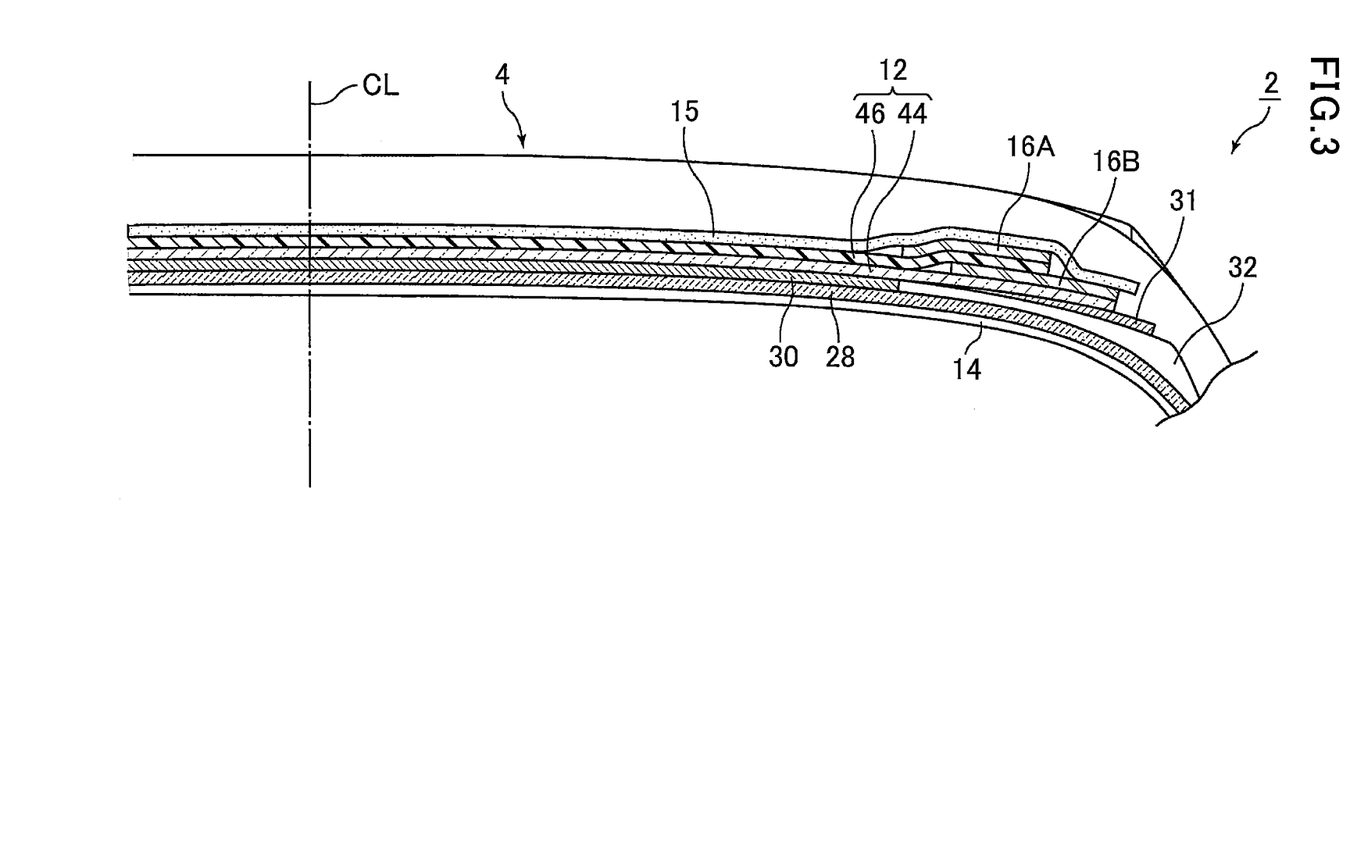
FIG. 3 is yet another example of a partial cross-sectional view of a pneumatic tire.

The rubber composition of the present invention is also used as a rubber composition for a breaker edge strip, a rubber composition for a breaker cushion, or a rubber composition for a strip adjacent to cords. FIGS. 1 to 3 are examples of partial cross-sectional views of the pneumatic tire of the present invention. FIG. 1 illustrates an example in which a breaker edge strip 16 is provided between an inner layer 44 and an outer layer 46 of a breaker 12 in the vicinity of an edge of the breaker 12, and between a carcass ply 28 and an over-breaker-cushion strip (first under-breaker strip) 31, a breaker cushion 32 is provided adjacent to a strip layer (BP strip layer) 30 between a breaker and a ply. FIG. 2 illustrates an example in which a breaker edge strip 16A is provided to coat an edge of the outer layer 46 of the breaker 12 in the vicinity of an edge of the breaker 12; a breaker edge strip 16B is provided to coat an edge of the inner layer 44 of the breaker 12; and between the carcass ply 28 and the inner layer 44 of the breaker 12 and the breaker edge strip 16B, the breaker cushion 32 is provided adjacent to the strip layer (BP strip layer) 30 between the breaker and the ply. FIG. 3 illustrates an example in which the breaker edge strip 16A is provided between the outer layer 46 of the breaker 12 and a band 15 in the vicinity of an edge of the breaker 12; the breaker edge strip 16B is provided between the inner layer 44 and the outer layer 46 of the breaker 12; and between the carcass ply 28 and the over-breaker-cushion strip (first under-breaker strip) 31, the breaker cushion 32 is provided adjacent to the strip layer (BP strip layer) 30 between the breaker and the ply.

FIGS. 1 to 3 each illustrate an example in which the strip layer (BP strip layer) 30 between the breaker and the ply is provided as a strip adjacent to cords, between the inner layer 44 of the breaker 12 and the carcass ply 28. Also, FIGS. 1 and 3 each illustrate an example in which the over-breaker-cushion strip (first under-breaker strip) 31 is provided as a strip adjacent to cords, between the inner layer 44 of the breaker 12 and the breaker cushion 32. The rubber composition of the present invention for a tire cord topping, a breaker edge strip, a breaker cushion, or a strip adjacent to cords is preferably used as a rubber composition for a tire cord topping.

The pneumatic tire of the present invention can be prepared by a conventional method using the above rubber composition.

Specifically, a rubber compositions containing the ingredients is extruded into the shape of a rubberized tire cord component such as a breaker, or a breaker edge strip, or a breaker cushion, or a strip layer between the breaker and the ply, and then assembled with other tire components in a usual manner on a tire building machine to build an unvulcanized tire. By heating the unvulcanized tire under pressure in a vulcanizer, a tire is produced.

EXAMPLES

Hereinafter, the present invention will be described in more detail with reference to examples which, however, are not intended to limit the scope of the present invention.

The various chemical agents used in examples and comparative examples are listed below.

NR: TSR20

IR: IR2200 from JSR Corp.

Modified BR: BR1250H (tin-modified BR polymerized using a lithium initiator; vinyl content: 10 to 13% by mass; Mw/Mn: 1.5; tin atom content: 250 ppm) from Zeon Corporation Modified SBR(HPR340): HPR340 (modified S-SBR, bound styrene content: 10% by mass, Tg: −64° C.; coupled by and terminated with an alkoxysilane, and then modified by a compound represented by formula (2) ($R^3$ to $R^5$=methoxy group, $R^6$ and $R^7$=hydrogen atom, n=3)) from JSR Corp.

Silica (VN3): ULTRASIL VN3 ($N_2SA$: 175 $m^2/g$) from Evonik Degussa

Carbon black (N351H): SHOBLACK N351H($N_2SA$: 73 $m^2/g$) from Cabot Japan K.K.

Carbon black (N326): DIABLACK N326 ($N_2SA$: 84 $m^2/g$, DBP oil absorption: 74 $cm^3/100$ g) from Mitsubishi Chemical Corporation Silane coupling agent: Si266 (bis(3-triethoxysilylpropyl) disulfide) from Evonik Degussa Antioxidant (6PPD): Antigene 6C(N-phenyl-N'-(1,3-dimethylbutyl-p-phenylenediamine) from Sumitomo Chemical Co., Ltd.

C5 petroleum resin (T-100AS): Marukarez T-100AS (C5 petroleum resin: aliphatic petroleum resin mainly formed from olefins and diolefins in C5 fraction obtained by naphtha cracking; softening point: 100° C.) from Maruzen Petrochemical Co., Ltd.

Coumarone-indene resin: NOVARES C10 (coumarone-indene resin, softening point: 5° C. to 15° C.) from Rutgers Chemicals TDAE process oil: vivatec500 from H&R Zinc oxide: zinc oxide #2 from Mitsui Mining & Smelting Co., Ltd.

Stearic acid: Tsubaki from NOF Corporation

Activator 73A (mixture of zinc salt of aliphatic carboxylic acid and zinc salt of aromatic carboxylic acid): activator 73A ((i) zinc salt of aliphatic carboxylic acid: zinc salt of fatty acid (carbon number: 8 to 12) from coconut oil, (ii) zinc salt of aromatic carboxylic acid: zinc benzoate; molar ratio: 1/1, zinc content: 17% by mass) from Struktol Cobalt stearate: cost-F (cobalt content: 9.5% by mass, stearic acid content: 90.5% by mass) from DIC Corporation Cobalt boron neodecanoate: Dicnate NBC-II (cobalt boron 3 neodecanoate, cobalt content: 22.0% by mass) from DIC Corporation HTS: DURALINK HTS (sodium hexamethylene-1,6-bisthiosulfate dihydrate) from Flexsys PK900: PERKALINK900 (1,3-bis(citraconimidomethyl)benzene) from Flexsys Insoluble sulfur: Crystex HSOT20 (insoluble sulfur containing 80% by mass of sulfur and 20% by mass of oil) from Flexsys Vulcanization accelerator (DCBS): Nocceler DZ (N,N'-dicyclohexyl-2-benzothiazolylsulfenamide) from Ouchi Shinko Chemical Industrial Co., Ltd.

Vulcanization accelerator (TBSI): SantoCure TBSI (N-tert-butyl-2-benzothiazolylsulfenimide) from Flexsys Vulcanization accelerator (BEHZ): BEHZ (N,N-di(2-ethylhexyl)-2-benzothiazolylsulfenamide) from Kawaguchi Chemical Industry Co., Ltd.

Vulcanization accelerator (TBBS): Nocceler NS(N-tert-butyl-2-benzothiazolylsulfenamide) from Ouchi Shinko Chemical Industrial Co., Ltd.

Partial condensate of HMMPME: SUMIKANOL 507A (modified etherified methylol melamine resin (partial condensate of hexamethylolmelamine pentamethyl ether (HMMPME)), (active ingredient content: 65% by mass, silica: 32% by mass, paraffinic oil: 3% by mass) from Sumitomo Chemical Co., Ltd.

Partial condensate of HMMM: Sumikanol 508 (partial condensate of hexamethoxymethylolmelamine (HMMM) (active ingredient content: 100% by mass)) from Taoka Chemical Co., Ltd.

HMT: Nocceler H (hexamethylenetetramine) from Ouchi Shinko Chemical Industrial Co., Ltd.

Modified phenol resin: PR12686 (cashew-oil-modified phenol resin; free phenol content: 0.2% by mass; novolac phenol resin content: 99.8% by mass, softening point: 94° C., Mw: 5330) from Sumitomo Bakelite Co., Ltd.

Unmodified phenol resin: PR53194 (novolac phenol resin, softening point: 93° C., Mw: 1400) from Sumitomo Bakelite Co., Ltd.

High-purity cresol resin: PR-X11061 (o-cresol, m-cresol, and p-cresol are used as alkylphenol unit (monomer unit); total free alkylphenol content: 0.6% by mass, novolac alkylphenol rein content: 99.4%, softening point: 128° C., Mw: 1800)

Low-purity cresol resin: Sumikanol 610 (meta-cresol resin (alkylphenol unit (monomer unit): m-cresol only (m-cresol accounts for 100% by mass of the amount of alkylphenol resin used in production of the resin (=100% by mass)), total free alkylphenol content: 8% by mass; novolac alkylphenol resin content: 92% by mass, softening point: 100° C., Mw: 2000) from Sumitomo Chemical Co., Ltd.

Modified resorcinol resin: Sumikanol 620 (modified resorcinol resin (modified resorcinol formaldehyde condensate)) from Taoka Chemical Co., Ltd.

The chemical agents in amounts shown in Table 1 to 3, except the sulfur, vulcanization accelerators and HTS, were kneaded in a 1.7-L Banbury mixer. Thereafter, the sulfur, vulcanization accelerator and HTS were added to the kneaded mixture using a roll mill, whereby an unvulcanized rubber composition was prepared.

Steel cords were topped with the unvulcanized rubber composition, and the resulting product was formed into a breaker shape. The product was then assembled with other tire components to build an unvulcanized tire. The unvulcanized tire was press-vulcanized at 170° C. for 12 minutes, whereby a test tire (tire size: 195/65R15) was prepared.

Also, a part of the topping rubber between two breaker layers of the test tire was cut out as a specimen.

The thus obtained unvulcanized rubber compositions, specimens, and the test tires were evaluated by the following methods. The results are shown in Tables 1 to 3.

(Viscoelasticity Test)

The complex elastic modulus (E*) (MPa) and loss tangent (tan δ) of each specimen were measured using a viscoelasticity spectrometer VES (produced by Iwamoto Seisakusho Co., Ltd.) at a temperature of 70° C., a frequency of 10 Hz, an initial strain of 10%, and a dynamic strain of 2%. Higher E* indicates higher rigidity and better hardness. Lower tan δ indicates lower heat build-up and better fuel economy.

Here, E* is preferably 9 to 11 MPa in terms of ride quality and handling stability. An E* value of more than 12 MPa is likely to lead to insufficient ride quality and handling stability.

(Tensile Test)

Using No. 3 dumbbell-shaped test pieces prepared from each specimen, a tensile test was carried out at room temperature in accordance with JIS K 6251 "Rubber, vulcanized or thermoplastic—Determination of tensile stress-strain properties", to measure the elongation at break EB (%). Higher EB indicates better elongation at break.

(Adhesion Test (Score of Rubber Coverage after Peeling): Adhesion to Cords)

Each specimen (sample for a peel test) was subjected to an adhesion test to measure the rubber coverage ratio after peeling (the percentage of rubber coverage on the peeled surface when the rubber was peeled from the steel cords). The results are presented on a 5-point scale. A score of 5 points indicates full coverage, and a score of 0 points indicates no coverage. A higher score indicates better adhesion to steel cords.

(Steering Response and Ride Quality)

The test tire was mounted on every wheel of a vehicle (Vitz from Toyota Motor Corporation). Then, a test driver drove the vehicle on a test track with circuit, zigzag and circumference roads where bar-like protrusions were provided on the road surface, and then the driver made sensory evaluations on steering response (the response of the vehicle to a minute change in steering angle) and ride quality during the driving on a six-point scale. A higher rating for steering response indicates better steering response. A higher rating for ride quality indicates better ride quality.

(Extrusion Processability)

Each of the unvulcanized rubber compositions was extruded and formed into the shape of a breaker. The formed article was subjected to sensory evaluations visually and by touch on edge conditions, compound scorch, and flatness on a 5-point scale. A higher rating indicates better extrusion processability.

With respect to the edge conditions, the straightest and smoothest edges were evaluated as good. With respect to the compound scorch, if a 15-cm-square, 2-mm-thick sheet cut out of the formed article had no irregularities due to cured bits, it was evaluated as good. With respect to the flatness, if such a sheet was flat enough to adhere tightly to a flat plate, it was evaluated as good (shrinking at the edges of the sheet causes a curl, deteriorating the flatness).
(Dry Heat Aging Durability Test)

The test tire was placed in a dry heat oven and aged at 80° C. for three weeks. The aged test tire was run on a drum under overload conditions in which the load is 140% of the maximum load (maximum air pressure conditions) defined in the JIS standard, and then the running distance at which a bulge of the tread portion or other abnormalities occurred was determined. The running distance of each composition is expressed as an index relative to that of Comparative Example 1 (=100). Here, a higher index indicates better durability (durability in high-temperature regions such as the Middle East).

(Hygrothermal Aging Durability Test)

The test was performed as mentioned for the dry heat aging durability test, except that the test tire was placed in a hydrothermal autoclave at a relative humidity of 95% and aged at 80° C. for four weeks. The running distance of each composition is expressed as an index relative to that of Comparative Example 1 (=100). A higher index indicates better durability (durability in southeastern Asia and in southwestern regions in Japan).

TABLE 1

| | | Example | | | | | | |
|---|---|---|---|---|---|---|---|---|
| | | 1 | 2 | 3 | 4 | 5 | 6 | 7 |
| Composition (part(s) by mass) | NR(TSR20) | 100 | 100 | 100 | 100 | 100 | 100 | 100 |
| | IR(IR2200) | — | — | — | — | — | — | — |
| | Modified BR(BR1250H) | — | — | — | — | — | — | — |
| | Modified SBR(HPR340) | — | — | — | — | — | — | — |
| | Silica (VN3) | 5 | 5 | 5 | 5 | 5 | 5 | 5 |
| | Carbon black (N351H) | — | — | — | — | — | — | — |
| | Carbon black (N326) | 55 | 55 | 55 | 55 | 55 | 55 | 55 |
| | Silane coupling agent (Si266) | — | — | — | — | — | — | — |
| | Antioxidant (6PPD) | 1 | 1 | 1 | 1 | 1 | 1 | 1 |
| | C5 petroleum resin (T-100AS) | 2 | 2 | 2 | 2 | 2 | 2 | — |
| | Coumarone-indene resin (C10) | — | — | — | — | — | — | — |
| | TDAE process oil | — | — | — | — | — | — | 2.5 |
| | Zinc oxide | 10 | 10 | 10 | 10 | 10 | 10 | 10 |
| | Stearic acid | 0.7 | 0.7 | 0.7 | 0.7 | 0.7 | 0.7 | 0.7 |
| | Activator 73A | — | — | — | — | — | — | — |
| | Cobalt stearate | — | — | — | — | — | — | — |
| | Cobalt boron neodecanoate | 0.44 | 0.44 | 0.44 | 0.44 | 0.44 | 0.44 | 0.44 |
| | HTS | 0.5 | 0.5 | 0.5 | 0.5 | 0.5 | 0.5 | 0.5 |
| | PK900 | — | — | — | — | — | — | — |
| | Insoluble sulfur | 7 | 7 | 7 | 7 | 7 | 7 | 7 |
| | (Net oil content) | (1.4) | (1.4) | (1.4) | (1.4) | (1.4) | (1.4) | (1.4) |
| | Vulcanization acceleartor (DCBS) | — | — | — | — | — | — | — |
| | Vulcanization accelerator (TBSI) | 1.1 | 1.1 | 1.1 | 1.1 | 1.1 | 1.1 | 1.1 |
| | Vulcanization accelerator (BEHZ) | — | — | — | — | — | — | — |
| | Vulcanization accelerator (TBBS) | — | — | — | — | — | — | — |
| | Partial condensate of HMMPME | 1.5 | 1.5 | 1.5 | 1.5 | 1.5 | 3 | 1.5 |
| | Partial condensate of HMMM | — | — | — | — | — | — | — |
| | HMT | — | — | — | — | — | — | — |
| | Modified phenol resin | 3 | 2 | 3.9 | — | — | — | 3 |
| | Unmodified phenol resin | — | — | — | 3 | — | — | — |
| | High-purity cresol resin | — | — | — | — | 3 | — | — |
| | Low-purity cresol resin | — | — | — | — | — | 3 | — |
| | Modified resorcinol resin | — | — | — | — | — | — | — |
| Evaluation | E* (70° C.) | 9.55 | 8.24 | 11.58 | 9.21 | 9.45 | 9.25 | 8.86 |
| | tan δ (70° C.) | 0.135 | 0.128 | 0.148 | 0.131 | 0.127 | 0.139 | 0.129 |
| | EB (%) | 410 | 435 | 390 | 405 | 400 | 410 | 395 |
| | Adhesion to cords | 5 | 5 | 5 | 5 | 5 | 5 | 4 |
| | Steering response | 6 | 5 | 6 | 6 | 6 | 6 | 5 |
| | Ride quality | 5 | 5 | 5 | 5 | 5 | 5 | 5 |
| | Extrusion processability | 5 | 5 | 5 | 5 | 5 | 5 | 5 |
| | Dry heat aging durability index | 120 | 135 | 115 | 115 | 125 | 115 | 110 |
| | Hygrothermal aging durability index | 130 | 130 | 120 | 130 | 130 | 130 | 110 |

| | | Example | | | | | | |
|---|---|---|---|---|---|---|---|---|
| | | 8 | 9 | 10 | 11 | 12 | 13 | 14 |
| Composition (part(s) by mass) | NR(TSR20) | 90 | 100 | 90 | 100 | 100 | 100 | 100 |
| | IR(IR2200) | 10 | — | 10 | — | — | — | — |
| | Modified BR(BR1250H) | — | — | — | — | — | — | — |
| | Modified SBR(HPR340) | — | — | — | — | — | — | — |
| | Silica (VN3) | — | 5 | 12 | 5 | 5 | 5 | 5 |
| | Carbon black (N351H) | — | — | — | — | — | — | — |
| | Carbon black (N326) | 60 | 55 | 48 | 55 | 55 | 55 | 55 |
| | Silane coupling agent (Si266) | — | — | — | — | — | — | — |
| | Antioxidant (6PPD) | 1 | 1 | 1 | 1 | 1 | 1 | 1 |
| | C5 petroleum resin (T-100AS) | — | — | 2 | 2 | 2 | 2 | 2 |
| | Coumarone-indene resin (C10) | 2.5 | — | — | — | — | — | — |

TABLE 1-continued

|  |  |  |  |  |  |  |  |  |
|---|---|---|---|---|---|---|---|---|
|  | TDAE process oil | — | — | — | — | — | — | — |
|  | Zinc oxide | 10 | 15 | 10 | 10 | 10 | 10 | 10 |
|  | Stearic acid | 0.7 | 0.7 | 0.7 | — | 1.5 | — | 0.7 |
|  | Activator 73A | — | — | — | — | — | 0.7 | 1.5 |
|  | Cobalt stearate | — | — | — | 1.5 | — | — | — |
|  | Cobalt boron neodecanoate | 0.44 | 0.44 | 0.44 | — | 0.44 | 0.44 | 0.44 |
|  | HTS | 0.5 | 0.5 | 0.5 | — | 0.5 | 0.5 | 0.5 |
|  | PK900 | — | — | — | — | — | — | — |
|  | Insoluble sulfur | 7 | 7 | 7 | 7 | 7 | 7 | 7 |
|  | (Net oil content) | (1.4) | (1.4) | (1.4) | (1.4) | (1.4) | (1.4) | (1.4) |
|  | Vulcanization acceleartor (DCBS) | — | — | — | — | — | — | — |
|  | Vulcanization accelerator (TBSI) | 1.1 | 1.1 | 1.1 | 1.1 | 1.1 | 1.1 | 1.1 |
|  | Vulcanization accelerator (BEHZ) | — | — | — | — | — | — | — |
|  | Vulcanization accelerator (TBBS) | — | — | — | — | — | — | — |
|  | Partial condensate of HMMPME | 1.5 | 1.5 | 1.5 | 4 | 1.5 | 1.5 | 1.5 |
|  | Partial condensate of HMMM | — | — | — | — | — | — | — |
|  | HMT | — | — | — | — | — | — | — |
|  | Modified phenol resin | 3 | 3 | 3 | 3 | 3 | 3 | 3 |
|  | Unmodified phenol resin | — | — | — | — | — | — | — |
|  | High-purity cresol resin | — | — | — | — | — | — | — |
|  | Low-purity cresol resin | — | — | — | — | — | — | — |
|  | Modified resorcinol resin | — | — | — | — | — | — | — |
| Evaluation | E* (70° C.) | 10.75 | 10.36 | 8.33 | 9.57 | 10.02 | 9.85 | 11.96 |
|  | tan δ (70° C.) | 0.137 | 0.137 | 0.126 | 0.127 | 0.136 | 0.139 | 0.148 |
|  | EB (%) | 395 | 425 | 455 | 395 | 375 | 395 | 365 |
|  | Adhesion to cords | 4 | 5 | 5 | 4 | 4- | 5 | 5 |
|  | Steering response | 6 | 6 | 5- | 6 | 6 | 6 | 6 |
|  | Ride quality | 4 | 5 | 5 | 5 | 4 | 5 | 4 |
|  | Extrusion processability | 5 | 4- | 5 | 5 | 5 | 5 | 5 |
|  | Dry heat aging durability index | 120 | 130 | 140 | 115 | 110 | 115 | 105 |
|  | Hygrothermal aging durability index | 120 | 135 | 130 | 115 | 110 | 135 | 115 |

TABLE 2

|  |  | Example | | | | | | |
|---|---|---|---|---|---|---|---|---|
|  |  | 15 | 16 | 17 | 18 | 19 | 20 | 21 |
| Composition (part(s) by mass) | NR (TSR20) | 80 | 80 | 100 | 100 | 100 | 100 | 100 |
|  | IR (IR2200) | — | — | — | — | — | — | — |
|  | Modified BR (BR1250H) | — | 20 | — | — | — | — | — |
|  | Modified SBR (HPR340) | 20 | — | — | — | — | — | — |
|  | Silica (VN3) | 5 | 5 | 10 | 5 | 5 | 5 | 5 |
|  | Carbon black (N351H) | — | — | 50 | — | — | — | — |
|  | Carbon black (N326) | 55 | 55 | — | 55 | 55 | 55 | 55 |
|  | Silane coupling agent (Si266) | — | — | — | — | — | — | — |
|  | Antioxidant (6PPD) | 1 | 1 | 1 | 1 | 1 | 1 | 1 |
|  | C5 petroleum resin (T-100AS) | 2 | 2 | 2 | 2 | 2 | 2 | 2 |
|  | Coumarone-indene resin (C10) | — | — | — | — | — | — | — |
|  | TDAE process oil | — | — | — | — | — | — | — |
|  | Zinc oxide | 10 | 10 | 10 | 10 | 10 | 10 | 10 |
|  | Stearic acid | 0.7 | 0.7 | 0.7 | 0.7 | 0.7 | 0.7 | 0.7 |
|  | Activator 73A | — | — | — | — | — | — | — |
|  | Cobalt stearate | — | — | — | — | — | — | — |
|  | Cobalt boron neodecanoate | 0.44 | 0.44 | 0.44 | 0.44 | 0.44 | 0.44 | 0.44 |
|  | HTS | 0.5 | 0.5 | 0.5 | 0.5 | 0.5 | 0.5 | — |
|  | PK900 | — | — | — | — | — | — | 1 |
|  | Insoluble sulfur | 7 | 7 | 7 | 7 | 7 | 7 | 7 |
|  | (Net oil content) | (1.4) | (1.4) | (1.4) | (1.4) | (1.4) | (1.4) | (1.4) |
|  | Vulcanization acceleartor (DCBS) | — | — | — | — | 1.3 | — | — |
|  | Vulcanization accelerator (TBSI) | 1.1 | 1.1 | 1.1 | 1.1 | — | — | 1.1 |
|  | Vulcanization accelerator (BEHZ) | — | — | — | — | — | 1.7 | — |
|  | Vulcanization accelerator (TBBS) | — | — | — | — | — | — | — |
|  | Partial condensate of HMMPME | 1.5 | 1.5 | 1.5 | — | 1.5 | 1.5 | 1.5 |
|  | Partial condensate of HMMM | — | — | — | 1.5 | — | — | — |
|  | HMT | — | — | — | — | — | — | — |
|  | Modified phenol resin | 3 | 3 | 3 | 3 | 3 | 3 | 3 |
|  | Unmodified phenol resin | — | — | — | — | — | — | — |
|  | High-purity cresol resin | — | — | — | — | — | — | — |
|  | Low-purity cresol resin | — | — | — | — | — | — | — |
|  | Modified resorcinol resin | — | — | — | — | — | — | — |
| Evaluation | E* (70° C.) | 9.85 | 9.55 | 13.25 | 9.61 | 9.42 | 9.62 | 9.65 |
|  | tan δ (70° C.) | 0.115 | 0.105 | 0.137 | 0.136 | 0.144 | 0.133 | 0.131 |
|  | EB (%) | 355 | 365 | 375 | 410 | 380 | 470 | 425 |
|  | Adhesion to cords | 4 | 4 | 5 | 5 | 5 | 5 | 4 |
|  | Steering response | 6 | 6 | 6 | 6 | 6 | 6 | 6 |
|  | Ride quality | 5 | 5 | 4- | 5 | 5 | 5 | 5 |

TABLE 2-continued

|  |  |  |  |  |  |  |  |
|---|---|---|---|---|---|---|---|
|  | Extrusion moldability | 5 | 5 | 4 | 5 | 5 | 5 | 5 |
|  | Dry heat aging durability index | 105 | 105 | 110 | 120 | 110 | 140 | 125 |
|  | Hygrothermal aging durability index | 105 | 110 | 110 | 130 | 110 | 135 | 115 |

|  |  | Example |  |  |  |  |  |  |
|---|---|---|---|---|---|---|---|---|
|  |  | 22 | 23 | 24 | 25 | 26 | 27 | 28 |
| Composition (part(s) by mass) | NR (TSR20) | 100 | 100 | 100 | 100 | 100 | 100 | 100 |
|  | IR (IR2200) | — | — | — | — | — | — | — |
|  | Modified BR (BR1250H) | — | — | — | — | — | — | — |
|  | Modified SBR (HPR340) | — | — | — | — | — | — | — |
|  | Silica (VN3) | 5 | 5 | 5 | 15 | 5 | 5 | 5 |
|  | Carbon black (N351H) | — | — | — | — | — | — | — |
|  | Carbon black (N326) | 55 | 55 | 55 | 50 | 55 | 55 | 55 |
|  | Silane coupling agent (Si266) | — | — | — | 1.2 | — | — | — |
|  | Antioxidant (6PPD) | 1 | 1 | 1 | 1 | 1 | 1 | 1 |
|  | C5 petroleum resin (T-100AS) | 2 | 2 | 2 | 2 | 2 | 2 | 2 |
|  | Coumarone-indene resin (C10) | — | — | — | — | — | — | — |
|  | TDAE process oil | — | — | — | — | — | — | — |
|  | Zinc oxide | 10 | 10 | 10 | 10 | 10 | 10 | 10 |
|  | Stearic acid | 0.5 | 0.7 | 0.7 | 0.7 | — | — | 0.7 |
|  | Activator 73A | 0.5 | — | — | — | — | — | — |
|  | Cobalt stearate | — | — | — | — | 2.1 | 2.5 | — |
|  | Cobalt boron neodecanoate | 0.44 | 0.44 | 0.44 | 0.44 | — | — | 0.22 |
|  | HTS | 0.5 | 1.0 | 0.5 | 1.0 | — | — | 0.5 |
|  | PK900 | — | — | — | — | — | — | — |
|  | Insoluble sulfur | 7 | 5.63 | 6.25 | 7 | 7 | 7 | 7 |
|  | (Net oil content) | (1.4) | (1.1) | (1.25) | (1.4) | (1.4) | (1.4) | (1.4) |
|  | Vulcanization acceleartor (DCBS) | — | — | — | — | — | — | — |
|  | Vulcanization accelerator (TBSI) | 1.1 | — | 1.1 | — | 1.1 | 1.1 | 1.1 |
|  | Vulcanization accelerator (BEHZ) | — | 2.7 | — | — | — | — | — |
|  | Vulcanization accelerator (TBBS) | — | — | — | 1.1 | — | — | — |
|  | Partial condensate of HMMPME | 1.5 | 1.5 | 1.5 | 1.5 | 4 | 4 | 1.5 |
|  | Partial condensate of HMMM | — | — | — | — | — | — | — |
|  | HMT | — | — | — | — | — | — | — |
|  | Modified phenol resin | 3 | 3 | 3.9 | 3.9 | 3 | 3 | 3 |
|  | Unmodified phenol resin | — | — | — | — | — | — | — |
|  | High-purity cresol resin | — | — | — | — | — | — | — |
|  | Low-purity cresol resin | — | — | — | — | — | — | — |
|  | Modified resorcinol resin | — | — | — | — | — | — | — |
| Evaluation | E* (70° C.) | 9.75 | 9.41 | 9.22 | 9.07 | 9.98 | 10.21 | 8.95 |
|  | tan δ (70° C.) | 0.128 | 0.136 | 0.144 | 0.122 | 0.124 | 0.135 | 0.141 |
|  | EB (%) | 410 | 465 | 425 | 385 | 360 | 330 | 435 |
|  | Adhesion to cords | 5 | 4 | 5 | 4- | 5 | 4 | 4- |
|  | Steering response | 6 | 6 | 6 | 6- | 6 | 6 | 5 |
|  | Ride quality | 5 | 5 | 5 | 5 | 5 | 5 | 5 |
|  | Extrusion moldability | 5 | 5 | 5 | 5 | 4 | 4- | 5 |
|  | Dry heat aging durability index | 125 | 140 | 125 | 105 | 105 | 100 | 125 |
|  | Hygrothermal aging durability index | 135 | 130 | 120 | 105 | 105 | 100 | 100 |

TABLE 3

|  |  | Comparative Example |  |  |  |  |  |  |  |  |  |
|---|---|---|---|---|---|---|---|---|---|---|---|
|  |  | 1 | 2 | 3 | 4 | 5 | 6 | 7 | 8 | 9 | 10 |
| Composition (part(s) by mass) | NR (TSR20) | 100 | 100 | 100 | 100 | 100 | 100 | 100 | 100 | 100 | 100 |
|  | IR (IR2200) | — | — | — | — | — | — | — | — | — | — |
|  | Modified BR (BR1250H) | — | — | — | — | — | — | — | — | — | — |
|  | Modified SBR (HPR340) | — | — | — | — | — | — | — | — | — | — |
|  | Silica (VN3) | 5 | 5 | 5 | 5 | 20 | 5 | 5 | 5 | 5 | 5 |
|  | Carbon black (N351H) | — | — | — | — | — | — | — | — | — | — |
|  | Carbon black (N326) | 55 | 55 | 55 | 55 | 40 | 55 | 55 | 55 | 55 | 55 |
|  | Silane coupling agent (Si266) | — | — | — | 1.6 | — | — | — | — | — | — |
|  | Antioxidant (6PPD) | 1 | 1 | 1 | 1 | 1 | 1 | 1 | 1 | 1 | 1 |
|  | C5 petroleum resin (T-100AS) | — | 2 | 2 | — | 2 | 2 | 2 | 2 | 2 | 2 |
|  | Coumarone-indene resin (C10) | — | — | — | — | — | — | — | — | — | — |
|  | TDAE process oil | 3.5 | — | — | 3.5 | — | — | — | — | — | — |
|  | Zinc oxide | 10 | 10 | 10 | 10 | 10 | 10 | 10 | 10 | 10 | 10 |
|  | Stearic acid | — | 0.7 | 0.7 | 0.7 | 0.7 | 0.7 | 0.7 | 0.7 | 0.7 | 0.7 |

TABLE 3-continued

| | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| | Activator 73A | 1.5 | — | — | — | — | — | — | — | — | — |
| | Cobalt stearate | — | — | — | — | — | — | — | — | — | — |
| | Cobalt boron neodecanoate | — | 0.44 | 0.44 | 0.44 | 0.44 | 0.44 | 0.44 | 0.44 | 0.44 | 0.44 |
| | HTS | 0.5 | 0.5 | 0.5 | 0.5 | 0.5 | 0.5 | 0.5 | 0.5 | 0.5 | 0.5 |
| | PK900 | — | — | — | — | — | — | — | — | — | — |
| | Insoluble sulfur | 7 | 7 | 7 | 7 | 7 | 7 | 7 | 7 | 7 | 7 |
| | (Net oil content) | (1.4) | (1.4) | (1.4) | (1.4) | (1.4) | (1.4) | (1.4) | (1.4) | (1.4) | (1.4) |
| | Vulcanization acceleartor (DCBS) | 1 | — | — | — | — | — | — | — | — | — |
| | Vulcanization accelerator (TBSI) | — | 1.1 | 1.1 | 1.1 | 1.1 | 1.1 | 1.1 | 1.1 | 1.1 | 1.1 |
| | Vulcanization accelerator (BEHZ) | — | — | — | — | — | — | — | — | — | — |
| | Vulcanization accelerator (TBBS) | — | — | — | — | — | — | — | — | — | — |
| | Partial condensate of HMMPME | 4 | 1.5 | 1.5 | 1.5 | 1.5 | 3 | 6 | — | 0.4 | 8 |
| | Partial condensate of HMMM | — | — | — | — | — | — | — | — | — | — |
| | HMT | — | — | — | — | — | — | — | 1.5 | — | — |
| | Modified phenol resin | 4 | 1.5 | 4.5 | 4.5 | 3 | — | 4.5 | 3 | 3 | 3 |
| | Unmodified phenol resin | — | — | — | — | — | — | — | — | — | — |
| | High-purity cresol resin | — | — | — | — | — | — | — | — | — | — |
| | Low-purity cresol resin | — | — | — | — | — | — | — | — | — | — |
| | Modified resorcinol resin | — | — | — | — | — | 3 | — | — | — | — |
| Evaluation | E* (70° C.) | 10.45 | 7.55 | 12.98 | 11.45 | 7.24 | 8.11 | 14.5 | 11.22 | 7.98 | 10.34 |
| | tan δ (70° C.) | 0.139 | 0.125 | 0.15 | 0.145 | 0.122 | 0.13 | 0.168 | 0.139 | 0.138 | 0.144 |
| | EB (%) | 325 | 495 | 355 | 335 | 485 | 345 | 295 | 345 | 485 | 295 |
| | Adhesion to cords | 3 | 5 | 5 | 4- | 5 | 5 | 5 | 2 | 5- | 5 |
| | Steering response | 6 | 3 | 6 | 6 | 3 | 4 | 6 | 6 | 4 | 6 |
| | Ride quality | 4 | 6 | 3 | 4 | 6 | 6- | 2 | 5 | 6 | 4 |
| | Extrusion processability | 5 | 5 | 3 | 5 | 3 | 4 | 3 | 3 | 5 | 5 |
| | Dry heat aging durability index | 100 | 130 | 105 | 105 | 140 | 105 | 70 | 100 | 115 | 70 |
| | Hygrothermal aging durability index | 100 | 130 | 105 | 100 | 130 | 120 | 85 | 70 | 120 | 90 |

The rubber composition of Comparative Example 1 containing large amounts of a modified phenol resin, process oil, and an activator together exhibited an unsatisfactory balance of the properties because it had excellent handling stability but was poor in other properties including ride quality, adhesion to cords, EB, and durability. In the examples using predetermined amounts of an isoprene-based rubber, a phenol or alkylphenol resin, and a partial condensate of HMMM or HMMPME while adjusting the amount of silica to a predetermined value or less, the balance of the properties including handling stability, fuel economy, durability, ride quality, and adhesion was synergistically improved to high levels.

For example, Comparative Examples 2, 3, 5, and 8 had problems in that the handling stability deteriorated when the amount of the modified phenol resin used was small, the ride quality and processability deteriorated when the amount of the modified phenol resin was large, the adhesion and processability deteriorated when HMT was used, and the handling stability and processability deteriorated when the amount of silica used was large. It was demonstrated that when specific amounts of specific components are used in combination and, at the same time, the amount of silica is adjusted to a predetermined value or less, the balance of the properties can be significantly and synergistically improved.

It was also demonstrated that test tires including a breaker edge strip, a strip layer between a breaker and a ply, or a breaker cushion with a similar formulation as used in the examples exhibited the effects as described above.

REFERENCE SIGNS LIST

2 Pneumatic tire
4 Tread portion
12 Breaker
14 Innerliner
15 Band
16 Breaker edge strip
16A Breaker edge strip
16B Breaker edge strip
28 Carcass ply
30 Strip layer between breaker and ply
31 Over-breaker-cushion strip
32 Breaker cushion
44 Inner layer
46 Outer layer

The invention claimed is:

1. A rubber composition for a tire cord topping, a breaker edge strip, a breaker cushion, or a strip adjacent to cords, the rubber composition comprising:
an isoprene-based rubber;
at least one of a phenol resin and an alkylphenol resin;
at least one of a partial condensate of hexamethoxymethylolmelamine and a partial condensate of a hexamethylolmelamine pentamethyl ether; and
a compound represented by formula (1) below,
wherein an amount of the isoprene-based rubber is 60% by mass or higher based on 100% by mass of a rubber component of the rubber composition,
a combined amount of the phenol resin and the alkylphenol resin is 2 to 3.9 parts by mass, a combined amount of the partial condensate of hexamethoxymethylolmelamine and the partial condensate of hexamethylolmelamine pentamethyl ether is 0.5 to 5 parts by mass, an amount of silica is 1 to 15 parts by mass, and an amount of the compound represented by the formula (1) is 0.5 to 3 parts by mass, each per 100 parts by mass of the rubber component, and
the phenol resin is a modified or unmodified phenol resin obtained by reacting phenol and an aldehyde in the presence of an acid or alkali catalyst;

(1)

wherein R¹ represents a $C_{6-16}$ alkyl group, and R² represents a $C_{6-16}$ branched alkyl group or a benzothiazolyl sulfide group.

2. The rubber composition according to claim 1,
wherein an amount of process oil is 2.5 parts by mass or less per 100 parts by mass of the rubber component.

3. The rubber composition according to claim 1, comprising
at least one selected from the group consisting of (A) stearic acid, (B) cobalt stearate, and (C) a mixture of a zinc salt of an aliphatic carboxylic acid and a zinc salt of an aromatic carboxylic acid.

4. The rubber composition according to claim 1,
wherein the rubber composition has a cobalt content of 0.05 to 0.2 parts by mass per 100 parts by mass of the rubber component.

5. The rubber composition according to claim 1, comprising
0.1 to 2 parts by mass of an organic thiosulfate compound per 100 parts by mass of the rubber component.

6. The rubber composition according to claim 1,
wherein the amount of silica is 4 to 15 parts by mass per 100 parts by mass of the rubber component.

7. The rubber composition according to claim 1,
wherein an amount of sulfur is 5 to 8 parts by mass per 100 parts by mass of the rubber component.

8. The rubber composition according to claim 1,
wherein the rubber composition has a total oil content of 2.0 to 4.0 parts by mass per 100 parts by mass of the rubber component.

9. The rubber composition according to claim 1, comprising
at least one of a C5 petroleum resin and a coumarone-indene resin.

10. A pneumatic tire, comprising
a rubberized tire cord component, a breaker edge strip, a breaker cushion, or a strip adjacent to cords, each formed from the rubber composition according to claim 1.

11. The rubber composition according to claim 2, comprising
at least one selected from the group consisting of (A) stearic acid, (B) cobalt stearate, and (C) a mixture of a zinc salt of an aliphatic carboxylic acid and a zinc salt of an aromatic carboxylic acid.

12. The rubber composition according to claim 2,
wherein the rubber composition has a cobalt content of 0.05 to 0.2 parts by mass per 100 parts by mass of the rubber component.

13. The rubber composition according to claim 3,
wherein the rubber composition has a cobalt content of 0.05 to 0.2 parts by mass per 100 parts by mass of the rubber component.

14. The rubber composition according to claim 2, comprising 0.1 to 2 parts by mass of an organic thiosulfate compound per 100 parts by mass of the rubber component.

15. The rubber composition according to claim 3, comprising
0.1 to 2 parts by mass of an organic thiosulfate compound per 100 parts by mass of the rubber component.

16. The rubber composition according to claim 4, comprising
0.1 to 2 parts by mass of an organic thiosulfate compound per 100 parts by mass of the rubber component.

17. The rubber composition according to claim 2,
wherein the amount of silica is 4 to 15 parts by mass per 100 parts by mass of the rubber component.

18. The rubber composition according to claim 3,
wherein the amount of silica is 4 to 15 parts by mass per 100 parts by mass of the rubber component.

19. The rubber composition according to claim 4,
wherein the amount of silica is 4 to 15 parts by mass per 100 parts by mass of the rubber component.

20. The rubber composition according to claim 5,
wherein the amount of silica is 4 to 15 parts by mass per 100 parts by mass of the rubber component.

21. The rubber composition according to claim 1, wherein in the compound of formula (1), wherein R¹ represents a $C_{6-12}$ alkyl group or R² represents a $C_{6-12}$ branched alkyl group or a benzothiazolyl sulfide group.

* * * * *